Patented Dec. 8, 1942

2,304,550

UNITED STATES PATENT OFFICE 2,304,550

RECLAIMED RUBBER

Paul J. Dasher, Akron, Ohio, assignor to The B. F. Goodrich Company, New York, N. Y., a corporation of New York No Drawing. Application November 1, 1939, Serial No. 302,367

14 Claims. (Cl. 260—720)

This invention relates to reclaimed rubber and has as its principal objects to provide an improved method for reclaiming soft-vulcanized rubber and to provide a reclaimed rubber closely approximating natural crude rubber in properties.

Due to the fact that reclaimed rubber is extensively used in the manufacture of many types of rubber articles, the reclaiming of vulcanized rubber has become one of the most important units of the modern rubber industry. Up to the present time the most widely used methods of reclaiming soft-vulcanized rubber have been the so-called acid method and the alkali method in which scrap vulcanized rubber is heated in the presence of an acid solution, or in the presence of an alkali solution, as the case may be. The reclaimed rubber produced by these and other known reclaiming methods is, however, by no means equivalent to the original crude rubber but differs from it in many important respects. For example, differences are evident in the milling and processing properties, in the tack, in solubility in the ordinary rubber solvents, in curing properties, and in similar physical characteristics. Summing up, it may be said that ordinary reclaimed rubber, as previously prepared, is merely plasticized vulcanized rubber. When this ordinary reclaimed rubber is mixed with solid crude rubber, a heterogeneous mixture is produced in which the reclaimed rubber is in the form of discrete particles that are clearly discernible by microscopic examination as being entirely distinct and separate from the solid crude rubber. Ordinary reclaimed rubber will not dissolve in the common rubber solvents merely by contact with the solvent and consequently does not dry to a smooth, homogeneous, and tacky film. Unlike solid crude rubber, freshly cut surfaces of ordinary reclaimed rubber cannot be pressed back together to form a tight bond.

I have discovered a method of reclaiming soft-vulcanized solid rubber that produces a plastic, homogeneous product possessing properties definitely superior to those of ordinary reclaimed rubber and, in fact, closely approximating the properties of natural crude rubber. This new reclaimed rubber can be broken down on a mill in much the same way that solid crude rubber is broken down. It dissolves in the ordinary rubber solvents, merely by contact with the solvent, to produce a cement that dries to a homogeneous tacky film. This reclaimed rubber blends perfectly with solid crude rubber and produces a homogeneous product with no discrete particles of the reclaimed rubber evident when examined under a microscope. Freshly cut surfaces of this new reclaimed rubber will form a tightly adhesive bond when merely pressed together. This new reclaimed rubber is not merely plasticized vulcanized rubber but is definitely a homogeneous material quite similar to milled natural crude rubber.

The reclaimed rubber of this invention can be blended with new crude rubber in substantial percentages for the manufacture of high quality rubber products. For example, tire treads may have incorporated in them considerable percentages of reclaimed rubber prepared according to the present invention and such treads resist wear equally as well as those made entirely from new crude rubber. This new reclaimed rubber can also be compounded with compounding ingredients in much the same way as crude rubber and can be vulcanized to form superior rubber articles. It can be molded, extruded and fabricated in any of the well known methods that are employed by the rubber industry and, in fact, may be used for any purpose for which prior reclaimed rubbers have been used.

To prepare the reclaimed rubber of the present invention I associate soft-vulcanized solid rubber, preferably in a finely-divided condition, with a polyamine having the general structure

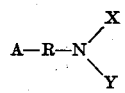

where R is an aliphatic nucleus; X is a hydrogen atom, a hydrocarbon nucleus or a substituted hydrocarbon nucleus containing no substituents other than hydroxyl groups, mercapto groups or amino groups; Y is X or OH; A is a radical including an amino nitrogen atom attached directly to R and with each of the remaining valences of the amino nitrogen atom satisfied by a hydrogen atom or a hydrocarbon nucleus. After associating the vulcanized rubber with a polyamine, the mixture is heated until the rubber becomes plastic, which ordinarily requires a heating comparable to the heating times and conditions now customarily employed in the acid and alkali reclaiming processes. This plastic mass may then be washed with water in order to remove any particles of fabric or other extraneous material that may have been present in the original vulcanized rubber scrap. The reclaimed rubber is then dried and thereupon is ready to be used like any solid crude rubber or ordinary reclaimed rubber in the preparation and manufacture of rubber articles or for uses to which such materials have been subjected.

Typical examples of the above aliphatic polyamines are the aliphatic diamines such as ethylene diamine, triamino triethyl amines, 1,3-diamino propane, 1,2-diamino propane; the aliphatic triamines such as 1,2,3-triamino propane, triethyl diethylene triamine, diethylene triamine; the aliphatic tetramines such as triethylene tetramine; the aliphatic pentamines such as tetraethylene pentamine; the aliphatic hexamines such as pentaethylene hexamine, as well as miscellaneous compounds such as 2-(diethyl amino) ethylamine, 1,2-(methyl amino) ethane, 1,2-(dimethyl amino) ethane, 1,2-(ethyl amino) ethane, and the like.

In order to illustrate the use of some typical polyamines in preparing the reclaimed rubber of this invention the following specific examples are set forth:

*Example 1.*—1000 grams of ground first quality rubber tire tread scrap are mixed with 50 grams of triethylene tetramine and the mixture is heated in an autoclave for three hours at 430° F. The mass is then removed and washed on a corrugated roll mill with water for five minutes and dried.

When 20% of this reclaimed rubber is blended with 80% of first quality new solid crude rubber and made up into tire treads, in the usual manner, these treads show a resistance to all wearing action that is equal to the wear resistance of first quality treads made entirely from new crude rubber.

*Example 2.*—90 pounds of ground grey rubber inner tube scrap are heated with 0.9 pound of tetraethylene pentamine in a No. 3 Banbury mixer. Steam at 400° F. is admitted to the jacket of the mixer and the batch is milled until the temperature of the batch reaches 400° F. This usually takes about 30 minutes. At the end of this period the plastic mass is dumped into water, cooled, and dried.

*Example 3.*—1000 grams of first quality ground red inner tube scrap are mixed with 50 grams of 1,3-diamino propane and 25 grams of water in a steam jacketed vessel and heated with steam for 24 hours at 370° F. The mass is then passed through corrugated steel rolls and dried.

It will be recognized that, in synthesizing many of the reclaiming agents hereinabove disclosed, various isomeric forms of the organic compounds may be produced. For example, when many of the longer chain polyamines including one or more nitrogen atoms in the nucleus, such as tetraethylene pentamine and the like, are synthesized, the synthesized product ordinarily will include isomers having a cyclo-aliphatic nucleus as well as isomers having a straight-chain aliphatic nucleus. All such isomeric forms of the reclaiming agents disclosed are contemplated in the present invention.

As will be apparent from the several specific examples hereinabove set forth and as has been previously indicated, the mixture of soft-vulcanized rubber and reclaiming agent ordinarily should be heated for a time and at a temperature of the same order as the times and temperatures customarily employed in the acid and alkali reclaiming processes. Heating is definitely essential to the present invention but the heating conditions are subject to considerable variation as is true in the conventional reclaiming processes. In ordinary commercial manufacturing operations the heating period may vary from twenty minutes to twenty-four hours or even longer, while the temperatures may vary from 200° F. to around 450° F., or even higher, so long as the temperature is not sufficiently high to decompose the materials; the higher temperatures ordinarily being employed for shorter periods and lower temperatures for longer periods. In all instances, the heating should be continued until the rubber is reduced to a plastic condition, which will be readily recognized by a worker familiar with reclaiming processes.

The herein described invention is applicable to any of the various types of soft-vulcanized rubber such as rubber scrap from boots, shoes, tires, inner tubes, belts, hose, and the like. Such scrap rubber may or may not be freed from fibrous material such as cord and fabric reinforcements and should preferably be comminuted.

The subject matter herein disclosed is also disclosed and claimed broadly in my copending application, Serial No. 302,366, filed concurrently with this application on Nov. 1, 1939.

Having herein disclosed and described illustrative embodiments of my invention, it is my desire that the invention be not limited to these embodiments but rather protected broadly, as limited only by the spirit and scope of the appended claims.

I claim:

1. A method of reclaiming soft-vulcanized rubber which comprises associating the vulcanized rubber with an aliphatic polyamine having the formula

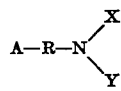

wherein R is an aliphatic nucleus; X is a member of the class consisting of hydrogen atoms, hydrocarbon nuclei, and substituted hydrocarbon nuclei containing as substituents only members of the class consisting of hydroxyl groups, mercapto groups and amino groups; Y is a member of the class consisting of hydrogen atoms, hydroxyl groups, hydrocarbon nuclei, and substituted hydrocarbon nuclei containing as substituents only members of the class consisting of hydroxyl groups, mercapto groups, and amino groups; A is a radical including an amino nitrogen atom attached directly to R and in which each of the remaining valences of the amino nitrogen atom is satisfied by a member of the class consisting of hydrogen atoms and hydrocarbon nuclei; and heating the associated materials at a temperature not lower than 200° F. until the rubber becomes plastic.

2. A method of reclaiming soft-vulcanized rubber which comprises associating the vulcanized rubber with an aliphatic diamine, and heating the associated materials at a temperature not lower than 200° F. until the rubber becomes plastic.

3. A method of reclaiming soft-vulcanized rubber which comprises associating the vulcanized rubber with 1,3-diamino propane, and heating the associated materials at a temperature not lower than 200° F. until the rubber becomes plastic.

4. A method of reclaiming soft-vulcanized rubber which comprises associating the vulcanized rubber with an aliphatic tetramine, and heating the associated materials at a temperature not lower than 200° F. until the rubber becomes plastic.

5. A method of reclaiming soft-vulcanized rubber which comprises associating the vulcanized rubber with triethylene tetramine, and heating the associated materials at a temperature not lower than 200° F. until the rubber becomes plastic.

6. A method of reclaiming soft-vulcanized rubber which comprises associating the vulcanized rubber with an aliphatic pentamine, and heating the associated materials at a temperature not lower than 200° F. until the rubber becomes plastic.

7. A method of reclaiming soft-vulcanized rubber which comprises associating the vulcanized rubber with tetraethylene pentamine, and heating the associated materials at a temperature not lower than 200° F. until the rubber becomes plastic.

8. A plastic reclaimed rubber that has been prepared by heating soft-vulcanized rubber at a temperature not lower than 200° F. in the presence of a polyamine having the general formula

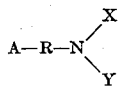

wherein R is an aliphatic nucleus; X is a member of the class consisting of hydrogen atoms, hydrocarbon nuclei, and substituted hydrocarbon nuclei containing as substituents only members of the class consisting of hydroxyl groups, mercapto groups and amino groups; Y is a member of the class consisting of hydrogen atoms, hydroxyl groups, hydrocarbon nuclei, and substituted hydrocarbon nuclei containing as substituents only members of the class consisting of hydroxyl groups, mercapto groups, and amino groups; A is a radical including an amino nitrogen atom attached directly to R and in which each of the remaining valences of the amino nitrogen atom is satisfied by a member of the class consisting of hydrogen atoms and hydrocarbon nuclei.

9. A plastic reclaimed rubber that has been prepared by heating soft-vulcanized rubber at a temperature not lower than 200° F. in the presence of an aliphatic diamine.

10. A plastic reclaimed rubber that has been prepared by heating soft-vulcanized rubber at a temperature not lower than 200° F. in the presence of 1,3-diamino propane.

11. A plastic reclaimed rubber that has been prepared by heating soft-vulcanized rubber at a temperature not lower than 200° F. in the presence of an aliphatic tetramine.

12. A plastic reclaimed rubber that has been prepared by heating soft-vulcanized rubber at a temperature not lower than 200° F. in the presence of triethylene tetramine.

13. A plastic reclaimed rubber that has been prepared by heating soft-vulcanized rubber at a temperature not lower than 200° F. in the presence of an aliphatic pentamine.

14. A plastic reclaimed rubber that has been prepared by heating soft-vulcanized rubber at a temperature not lower than 200° F. in the presence of tetraethylene pentamine.

PAUL J. DASHER.